United States Patent [19]

Mylläri

[11] Patent Number: 6,039,527
[45] Date of Patent: *Mar. 21, 2000

[54] CONTAINER COMBINATION AND A MEHTOD OF HANDLING CONTAINERS

[75] Inventor: Esa Mylläri, Mönsteràs, Sweden

[73] Assignee: Multilift Oy, Raisio, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/676,149

[22] PCT Filed: Jan. 25, 1995

[86] PCT No.: PCT/FI95/00036

§ 371 Date: Jul. 16, 1996

§ 102(e) Date: Jul. 16, 1996

[87] PCT Pub. No.: WO95/20501

PCT Pub. Date: Aug. 3, 1995

[30] Foreign Application Priority Data

Jan. 26, 1994 [FI] Finland .................................. 940396

[51] Int. Cl.⁷ ....................................................... B60P 1/64
[52] U.S. Cl. .................... 414/491; 414/498; 414/546; 414/812; 280/DIG. 8
[58] Field of Search .................... 414/491, 498, 414/546, 555, 812; 410/83; 24/287; 280/DIG. 8

[56] References Cited

U.S. PATENT DOCUMENTS

| | | | |
|---|---|---|---|
| 3,073,466 | 1/1963 | Greer et al. .............................. | 414/498 |
| 3,086,673 | 4/1963 | Tantlinger et al. ........... | 280/DIG. 8 X |
| 3,092,282 | 6/1963 | Tantlinger et al. ........... | 280/DIG. 8 X |
| 3,130,847 | 4/1964 | Dempster et al. ..................... | 414/491 |
| 3,188,042 | 6/1965 | Watters ..................................... | 410/83 |
| 3,317,219 | 5/1967 | Hindin et al. ......................... | 24/287 X |
| 3,460,862 | 8/1969 | Abolins ......................... | 280/DIG. 8 X |
| 3,711,902 | 1/1973 | Eggert, Jr. .................... | 280/DIG. 8 X |
| 3,984,013 | 10/1976 | Wirz . | |
| 4,290,726 | 9/1981 | Sutela . | |
| 4,431,368 | 2/1984 | Katz et al. ............................. | 410/69 X |
| 4,856,150 | 8/1989 | Johnson ................................. | 410/83 X |
| 4,993,125 | 2/1991 | Capron et al. ............................. | 24/287 |
| 5,326,212 | 7/1994 | Roberts .................................. | 414/498 X |

FOREIGN PATENT DOCUMENTS

| | | | |
|---|---|---|---|
| 0107892 | 9/1987 | European Pat. Off. . | |
| 60289 | 12/1981 | Finland . | |
| 286143 | 1/1991 | German Dem. Rep. ............... | 414/546 |
| 1938633 | 2/1971 | Germany . | |
| 3927646 | 3/1991 | Germany ................................ | 414/546 |
| 138033 | 10/1981 | Japan ....................................... | 414/546 |
| 453740 | 2/1988 | Sweden . | |
| WO93/18934 | 9/1993 | WIPO . | |

*Primary Examiner*—James W. Keenan
*Attorney, Agent, or Firm*—Burns, Doane, Swecker & Mathis, L.L.P.

[57] ABSTRACT

A method, a container combination, and a container, wherein at least two containers are handled simultaneously by a vehicle's loading device. The containers can be handled separately by a loading device. The individual containers are connectable to one another to form a container combination and the container combination is lifted onto a vehicle and removed from the vehicle by making engaging devices of the loading device engage with a grasping component on a foremost container of the container combination.

10 Claims, 8 Drawing Sheets

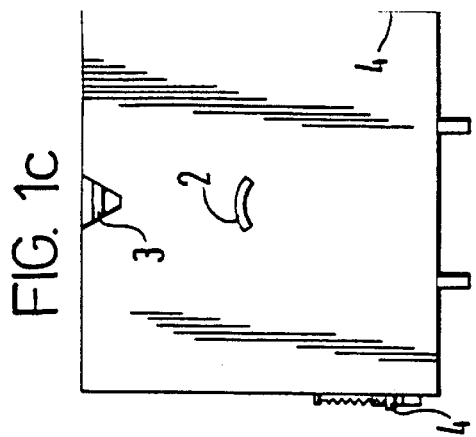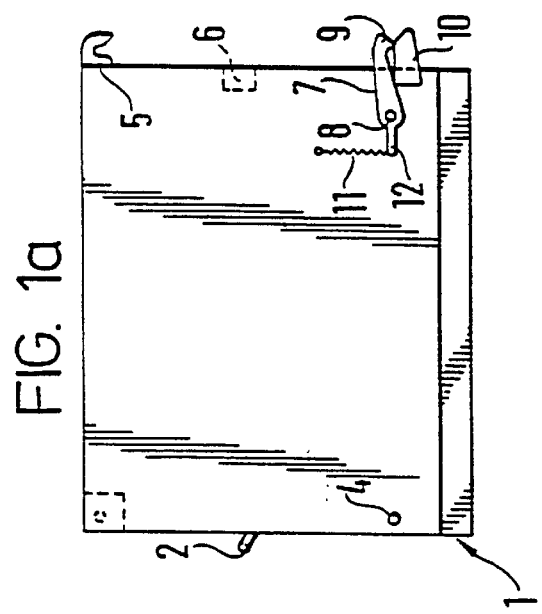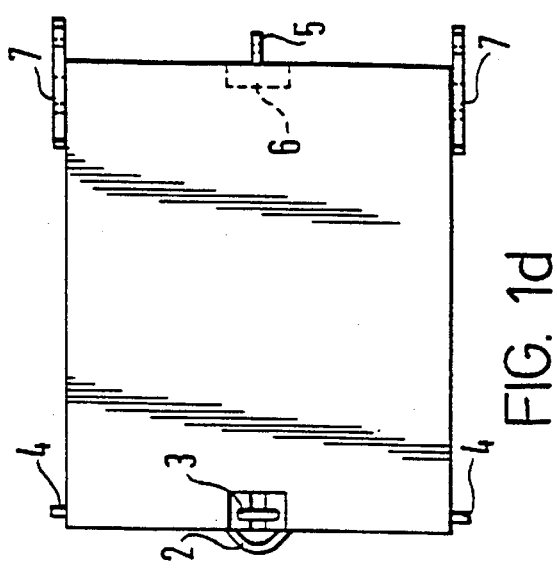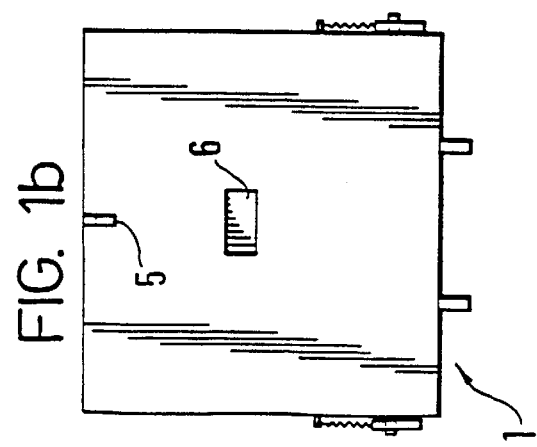

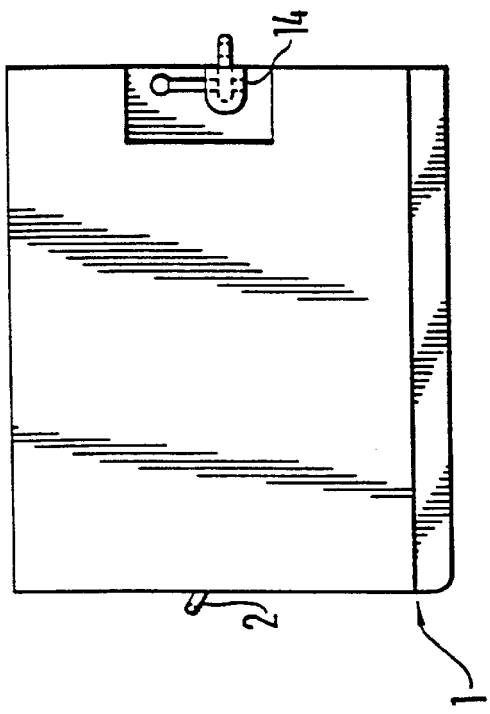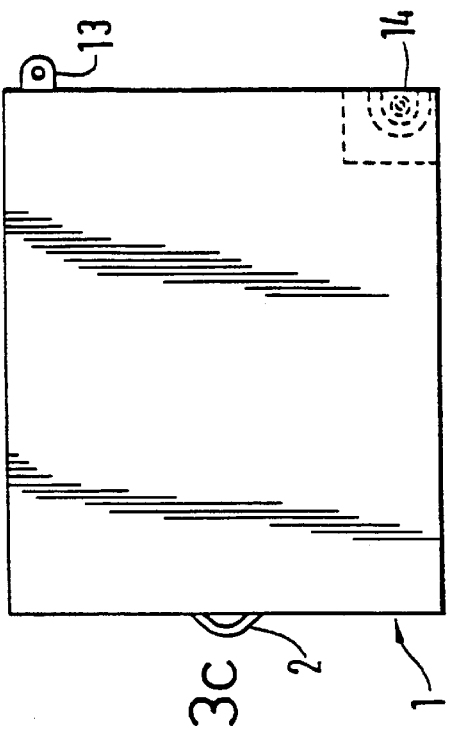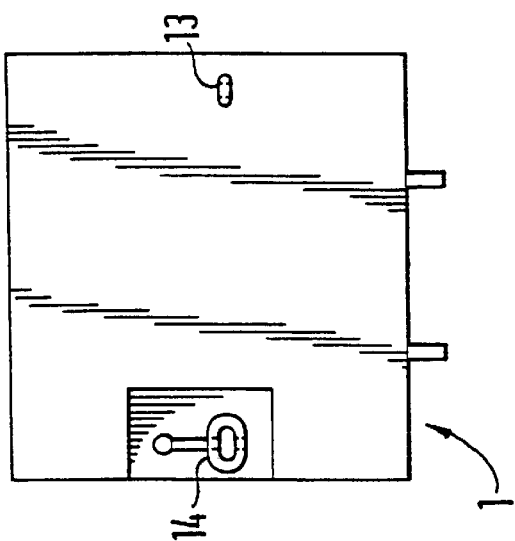

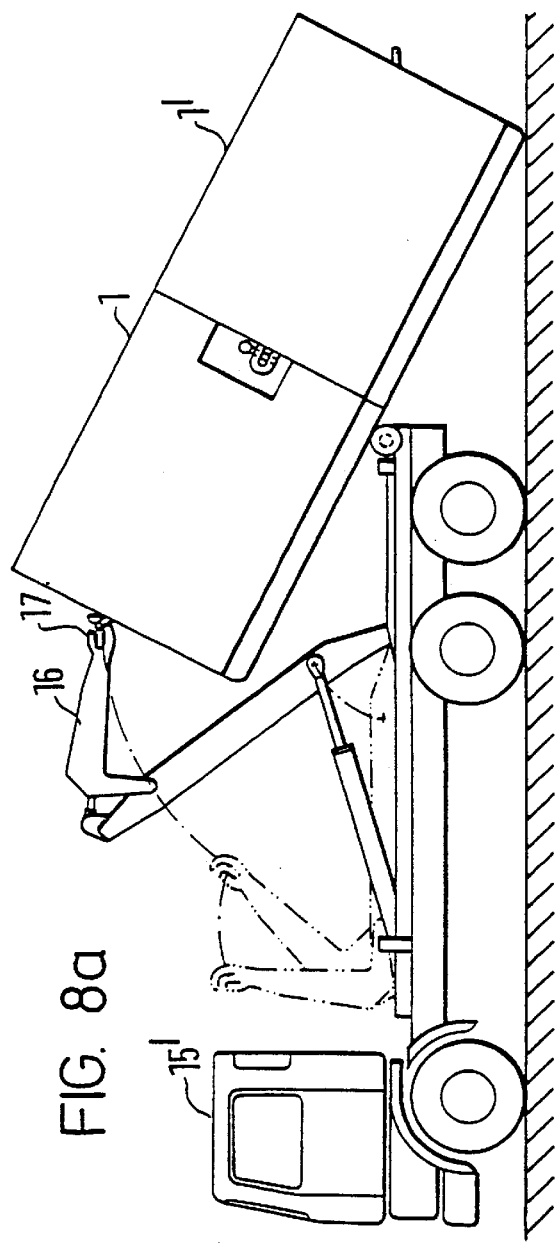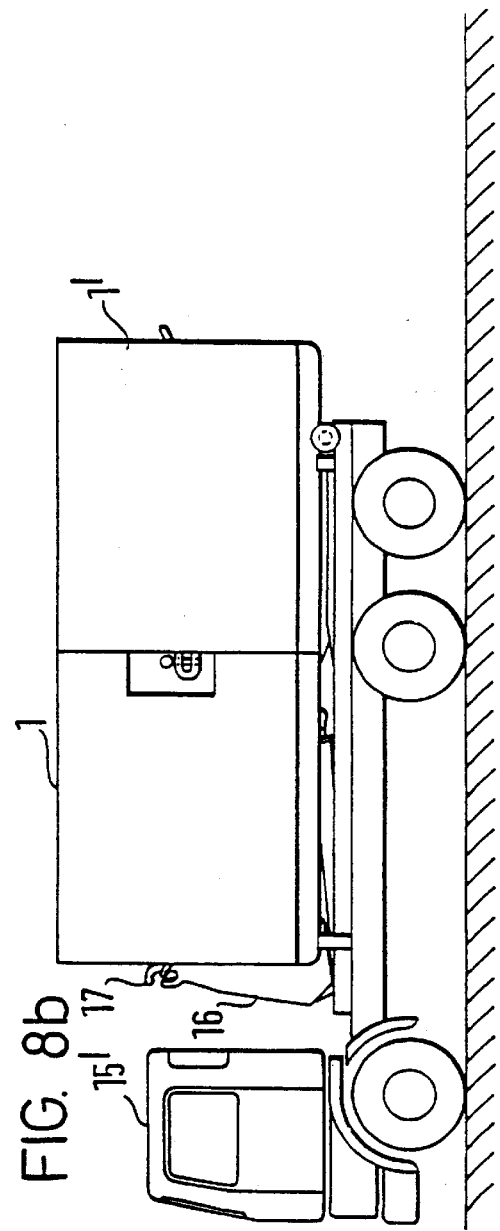

CONTAINER COMBINATION AND A MEHTOD OF HANDLING CONTAINERS

BACKGROUND AND SUMMARY OF THE INVENTION

This invention relates to a method of handling at least two containers simultaneously with the loading device of a vehicle, which is equipped with at least one engaging means (i.e. a hook) for engaging with a least one grasping component (i.e. a hook bar) at the front end of the container and for lifting the container onto a vehicle and unloading it therefrom. The invention also relates to a combination made up of at least two containers, wherein each container is provided with at least one hook bar and can be handled separately by the vehicle's load handling system (LHS). As is, e.g. from British Patent (EP) No. 107892 or U.S. Pat. No. 3,984,013, a LHS is equipped with at least one hook for engaging with a hook bar at the front end of the container for moving the container on and off vehicle.

Various garbage collection systems are known wherein the garbage is compressed by using a piston. The garbage container is located in the garbage transport vehicle. Small garbage bins located at houses are emptied into the collecting container in the vehicle and the garbage is compressed. The collecting containers can be handled in the same way as exchangeable platforms. Collecting vehicles equipped with compressing equipment are used for short journeys between houses and separate highway transporting vehicles are used for transporting the collecting garbage containers to a dumping area or to a garbage treatment plant. Collecting vehicles moving between houses are advantageous for handling relatively short exchangeable platforms. However such short exchangeable platforms, the length of which may be 3 m, cannot be handled by the LHS of bigger vehicles which are intended for handling platforms of an approximate length of 6 m. For longer distance transportation it would be more advantageous to use bigger units.

A known LHS is described in the Finnish printed patent specification 63350. This LHS is a so-called hook-type device. It has an L-shaped member pivoting around a transverse shaft. A hook is located at the free end of the L-shaped member, A method is known previously of loading two or several exchangeable containers or platforms or pallets into a longer exchangeable platform or exchangeable platform frame, which is provided with a hook bar. The truck's LHS engages with the hook bar of the longer exchangeable platform which acts as a supporting base, and moves it onto the truck for transportation.

It is further known to connect rigidly together two sea containers end-to-end at their corner castings. In this known arrangement separate locking means are used which are attached manually in between the containers. The container combination is then handled by a fork truck so that its forks support the containers from below.

The method according to this invention is characterised in that two containers, which can be handled separately by loading equipment and the end of which are to be placed against each other and are provided with at least one connecting means, are connected together, and thus connected the containers are moved onto a vehicle or removed from a vehicle as one unit by making the hook of the loading equipment engage with the hook bar of the foremost container. The exchangeable platform of the invention is characterised in that the container ends, which are to be fitted against each other, are provided with at least one connecting means which can be used for connecting the containers together so that the combination formed by the containers can be handled by the loading equipment as one unit. The connecting means preferably comprises a locking component of a locking means attached to one container and a counterpart of the locking means attached to the other container. The locking component has a locking means which can be moved from a closed position to an opened position and which can be opened with the aid of a means attached to the other container when pushing the containers against one another, and which is in the closed position when the containers are against one another.

In such a system according to this aspect of the invention no such separate bases are needed onto which the containers would be lifted, nor any loose additional connectors for connecting the containers together. The longer exchangeable container formed according to the invention can be lifted into a vehicle equipped with a suitable LHS. If required it can be moved from the vehicle onto a full trailer.

The containers can be connected to each other simply by reversing the vehicle into position, whereby the vehicle pushes the container on the vehicle towards the other one and the opened locking means of the connecting means will close automatically. For connecting, the driver of the vehicle need not leave the cab of the vehicle.

A container of length of e.g. 3 m. can be connected to a garbage collecting vehicle by a small LHS. Such a short container is light to move, and can be used in a housing estate for collecting garbage. When two containers are connected together in accordance with the invention, a resulting composite container is formed of an approximate length of 6 m. This can be moved onto a 3-axle truck using a conventional LHS. Such a unit corresponds in terms of dimensions to a typical transporting unit for heavy 3-axle vehicles.

Two double containers can be transported by a full trailer combination so that one 6 m. unit is on the towing vehicle while the other is on the full trailer. The first double unit is loaded onto the trailer by using the hook-type exchange platform device of the towing vehicle by first lifting it on the vehicle into a horizontal position and then pushing it onto the trailer of the vehicle. The other double unit is then lifted onto the vehicle using the same hook-type exchange platform device. Even two double containers can be loaded onto a longer trailer one after the other so that one is loaded from the leading end of the trailer and the other from the rear end. In this way very large transport units are achieved for longer transportations.

BRIEF DESCRIPTION OF THE DRAWINGS

The invention will be better understood from the following non-limiting description given with reference to the accompanying drawings, in which:

FIGS. 1a–1d are side views, views from one end and from above respectively of an embodiment of a container in accordance with the invention, FIGS. 3a–3c are side views, views from one end and from above respectively of another embodiment of the container in accordance with the invention, FIGS. 8a and 8b are side views of the handling of two containers connected to one another.

DETAILED DESCRIPTION

Figure 2:
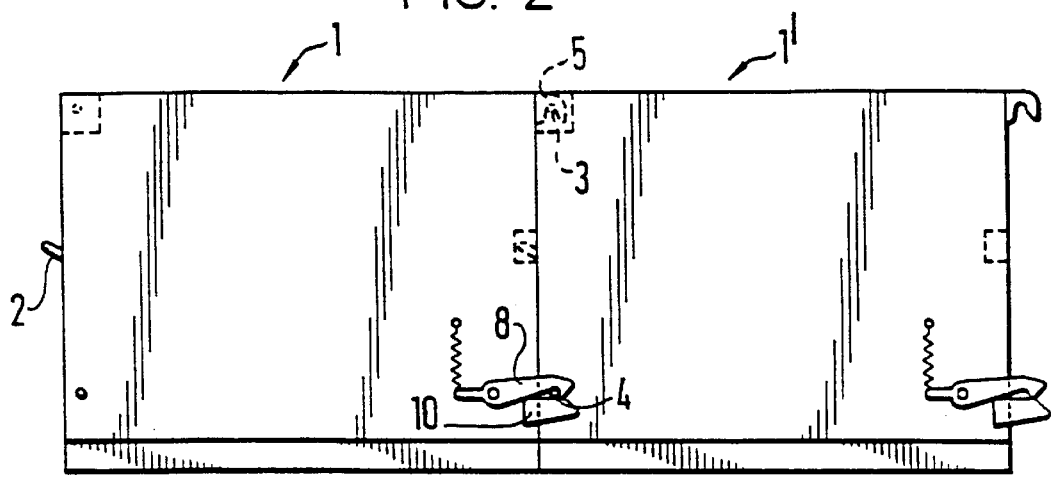
FIG. 2 is a side view of two containers shown in FIGS. 1a–1d connected to one another.

In the container 1 shown in FIGS. 1a–1d end wall has a hook bar 2, which may be engaged by the hook of the LHS. In a recess in the middle of the top part of the same end wall there is a connecting link 3, and on the sides in the lower part there are pins 4, which act as components of the connecting means.

In this specification the terms hook and hook bar have been used. By hook is to be understood any hooking or grasping element which can be engaged with a hook bar to permit lifting thereof. By hook bar is meant any bar or rod suitable for engagement by a hook as above defined, or suitable to be grasped or otherwise secured to a hook as above defined to permit safe lifting or shifting of heavy loads.

A connecting hook 5 with its hook extending downwards is fixed to and located in the middle of the top part of the other end wall of the container 1. In the middle of the same end wall and level with the hook bar 2 there is a recess 6, which will receive the hook bar 2 of the second container which is to be connected with the first container 1. Catches, herein called clasps, 7 are provided as locking components on the sides of the lower part of this end wall.

Each clasp 7 is mounted pivotably on a shaft S. The clasp part extending from the container has a hook 9 extending downwards and pressing against a counterpart 10 when pulled by a spring 11 which is mounted between the opposite end of the clasp and the container wall. The clasp has a handle 12 between the shaft 8 and the spring 11.

FIG. 2 shows two containers 1, 1', the ends of which are fitted against each other so that the connecting hook 5 of the first container 1 has engaged with the connecting link 3 of the other container and the clasps 8 of the first container have engaged with the pins 4 of the other container. When connected together the containers form a rigid combination which can be handled as one unit.

FIGS. 3a–3c show an embodiment where on one side of one end of the container approximately midway vertically there is a link 13 working as a counterpart for the connecting means. A locking component 14 is fitted into a recess on the other side of the same end at the corresponding height. The other end of the container is provided with a hook bar 2, but it has no connecting means.

The connecting means used in this embodiment is similar to the pulling hooks mentioned above, which are used for connecting the trailer to the vehicle.

Figure 4:
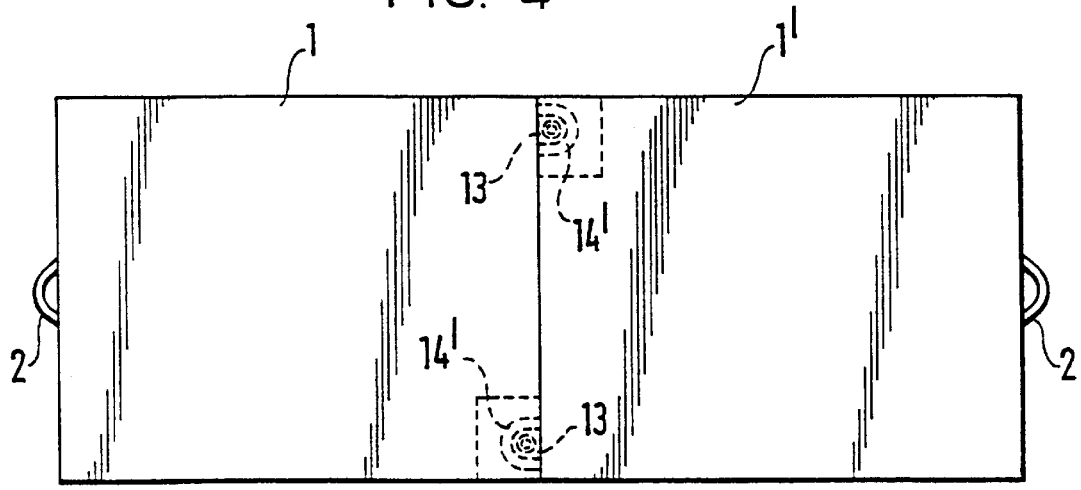
FIG. 4 is a view from above of two containers shown in FIGS. 3a–3c connected to one another.

FIG. 4 shows a combination of two containers shown in FIGS. 3a–3c, so that the locking component 14 of the first container 1 has engaged with the link 13' of the second container 1' and the locking component 14' of the second container has engaged with the link 13 of the first container. The hook bar 2 of the left-hand container is at the outermost end of the combination.

Figure 5C:
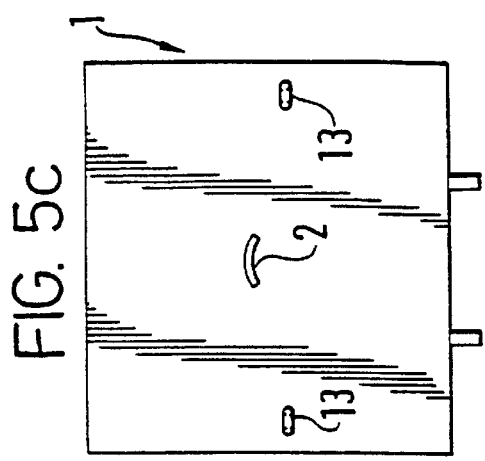
FIGS. 5a–5c are side views and views from both ends of a third embodiment of the container according to the invention.
Figure 5A:
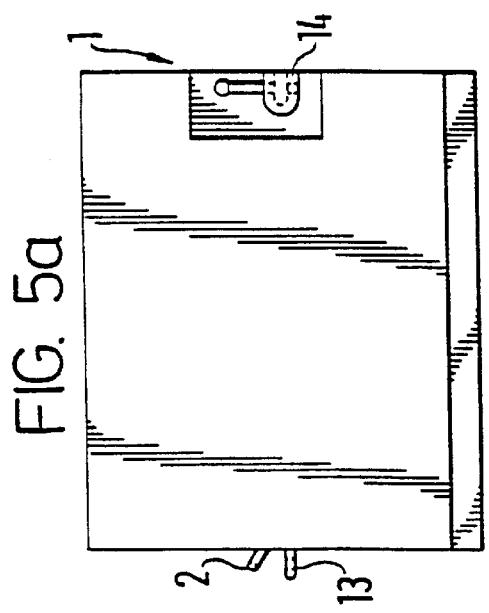
Figure 5B:
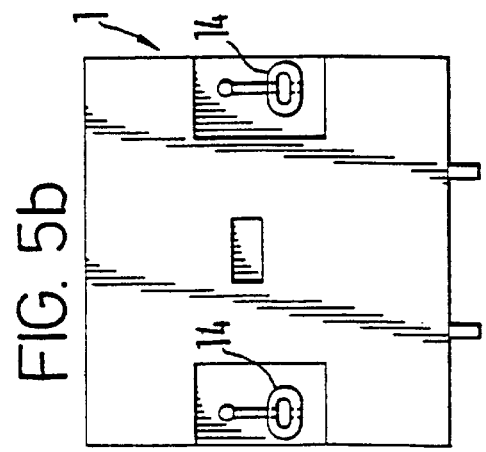
Figure 6:
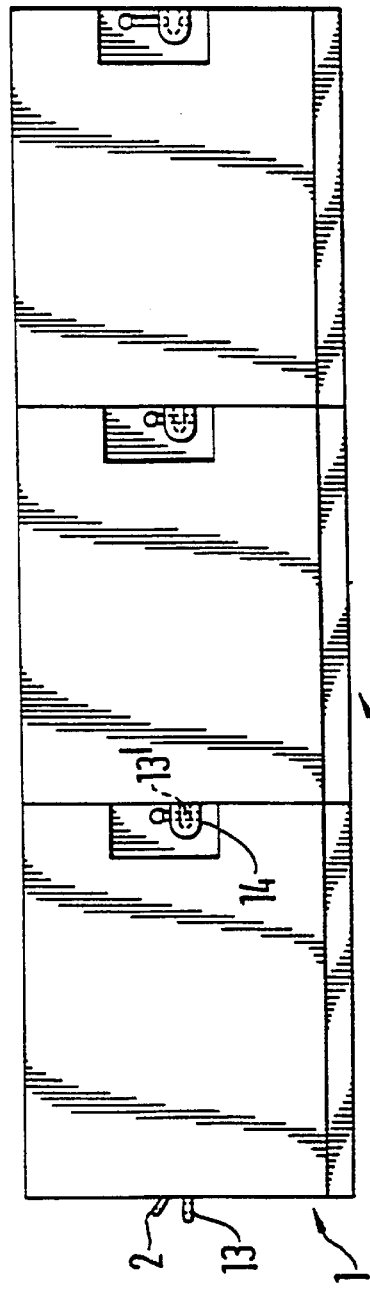
FIG. 6 is a side view of three containers shown in FIGS. 5a–5c connected to one another.
Figure 7A:
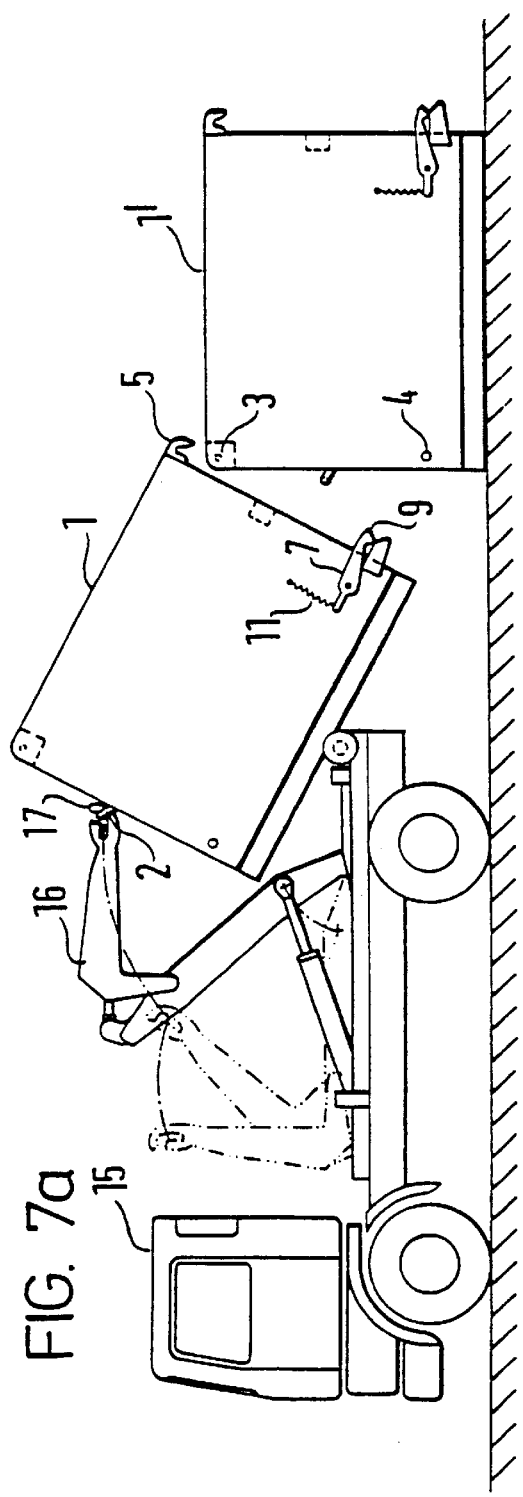
FIGS. 7a and 7b are side views of an example of how two containers are connected together.
Figure 7B:
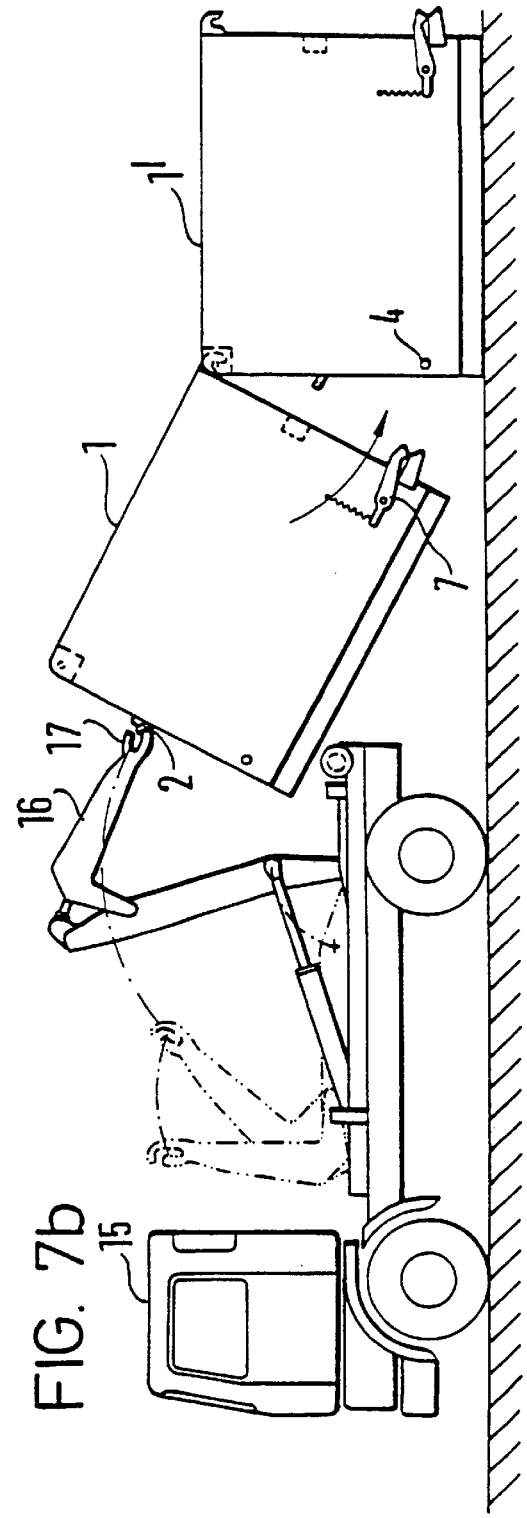

The embodiment shown in FIGS. 5a–5c is similar to the embodiment shown in FIGS. 3a–3c. The difference, however, is that in one end of container 1 there are links 13 on both sides and in the other end on both sides there are locking means 14 fitted into recesses. One end has a hook bar 2 and the other end has a recess 6 for the hook bar. More than two such containers may be fitted one after the other as is shown in FIG. 6. FIGS. 7a and 7b show how the two containers of FIGS. 1a–1c are connected to each other with the aid of a collecting vehicle 15 having an LHS. Container 1' is on the ground and container 1 is on vehicle 15. FIG. 7a shows how lowering of container 1 is begun in order to place it on the ground in front of container 1'. FIG. 7b shows the next step where connecting hook 5 of container 1 has lowered to rest on top of connecting link 3 of container 1'. Using the loading device, container 1 is then lowered further, whereby it turns in the direction shown by the arrow round an axis formed by connecting link 3, and clasps 7 of container 1 come against pins 4 of container 1'. As container 1 turns further, pins 4 press the hook parts 9 of clasps 7 upwards against the force of springs 11 and the clasps will open. In this way the pins enter the hook parts of the clasps, whereupon the spring force will again close the clasps.

The connected containers 1, 1' can then be moved onto the longer transport vehicle 15' in the way shown in FIGS. 8a and 8b.

The containers of FIGS. 3–6, which have no connecting hook 5 or connecting link 3 in the top part of the container, are connected together by a horizontal pushing motion. A vehicle carrying a container is driven into position in front of a container resting on the ground. The container on the vehicle is lowered to rest on the ground and using the vehicle's loading device it is pushed against the other container on the ground, whereby the connecting means will first open in the final stage of the pushing motion and will finally close as the containers are against one another.

The invention is not limited only to the embodiments present above, but it may vary in different ways within the scope of the claims.

Other devices than the hook-type device described with reference to the drawings may be used as the loading device. For example, a so-called winch and cable device or a so-called endless chain lifting device may be used, in both of which there is an engaging hook or an equivalent thereof, attached to a flexible means, such as a cable or a chain.

Instead of being of the type opening on a counterpart of the opposite container, the locking component may also be similar to the trailer towing hook described above, that is, of a type first opened manually and locked in an opened position, from which it will close when the releasing means is moved. The locking means can be opened or released to close either of the said counterpart of the other container or on a separate pushing component. Release may also take place as the end wall of one container is pushed against a separate pushing means in the locking component.

A counterweight and gravity may also be used instead of spring force.

Figure 9:
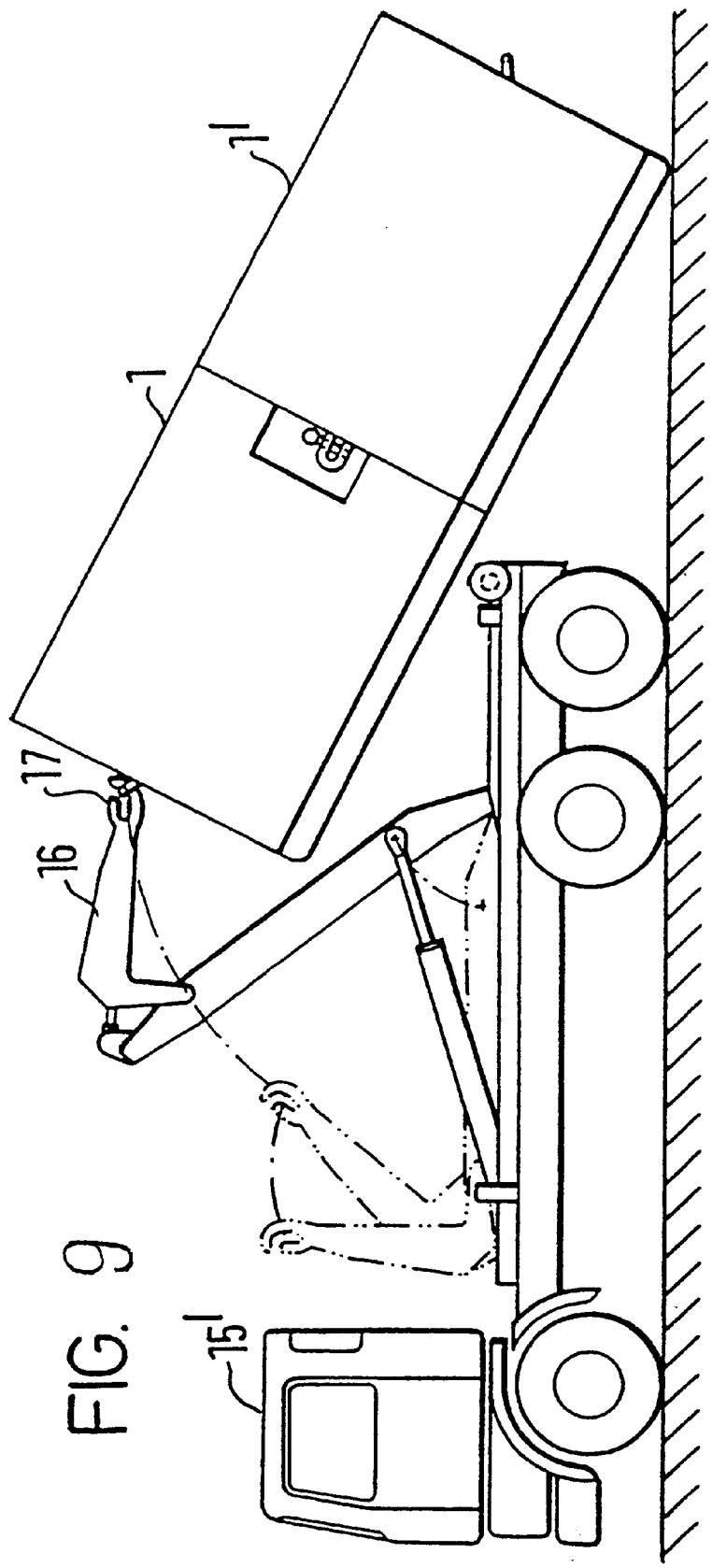
FIG. 9 is a side view of another embodiment of the handling of two containers connected to one another.
Figure 10:
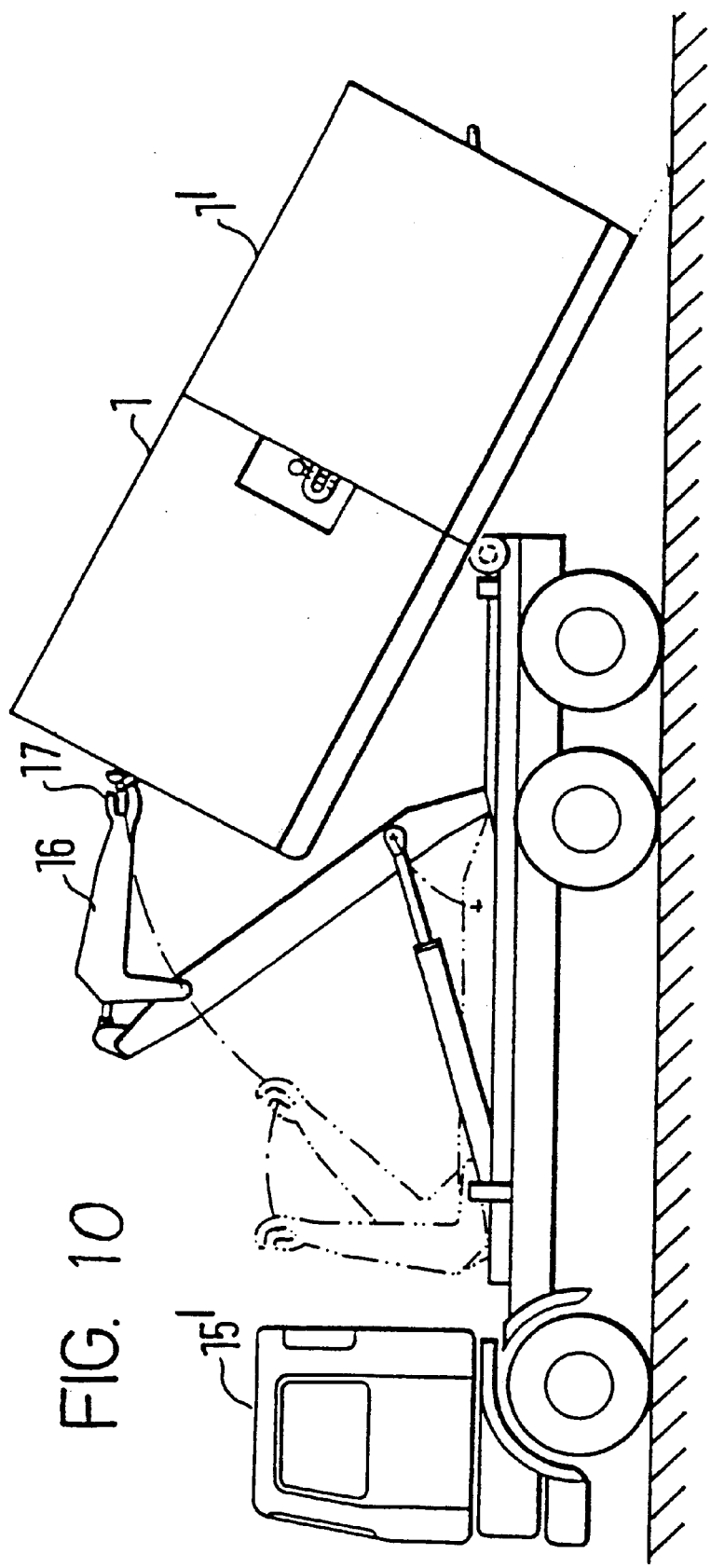
FIG. 10 is a side view of another embodiment of the handling of two containers connected to one another.

Thus, the connecting means can be designed in many different ways. Nor is it necessary for the connection to be entirely rigid. The essential thing is that the connection is sufficiently rigid and strong so that the combination can be supported by the hook of the loading device from the hook bar of the foremost container even when only the bottom edge of the rear end of the combination is resting on the ground (FIG. 9) or when the combination is inclined and rests on a rear roller (FIG. 10).

When using a chain or cable device only bottom container edges need to be connected to one another by a hinge-type connection.

I claim:

1. A method of simultaneously handling at least two containers using a loading device of a vehicle, comprising the steps of:

connecting adjacent ones of the at least two containers, each of the at least two containers having, at at least one end of each of the at least two containers, at least one connecting device, by connecting the at least one connecting device of the adjacent ones of the at least two containers to form a connection;

engaging an engaging device of a loading device of a vehicle with at least one grasping component at a front end of a foremost container of the at least two containers;

lifting the at least two containers in a rigid, connected condition onto the vehicle such that, at an initial stage of the lifting, a unit formed by the at least two containers is supported from the grasping member in the front end of the foremost container of the at least two containers while a rear lower edge of a rearmost container of the at least two containers is supported on the ground, and bottoms of the at least two containers are separated from any support surface, and forces on the at least two containers urge the at least two containers to tend to fold upwardly around the connection of the at least two containers and, during a subsequent stage of the lifting, the unit formed by the at least two containers is inclined and rests on a rear roller of the vehicle such that forces on the containers tend to urge the containers to fold downwardly around the connection of the at least two containers; and removing the at least two containers in a rigid, connected condition from the vehicle such that, during a stage of the removal, the unit formed by the at least two containers is inclined and rests on a rear roller of the vehicle such that forces on the containers tend to urge the containers to fold downwardly around the connection of the at least two containers and, at a final stage of the removal, the unit formed by the at least two containers is supported from the grasping member in the front end of the foremost container of the at least two containers while the rear lower edge of the rearmost container of the at least two containers is supported on the ground, and bottoms of the at least two containers are otherwise separated from any support surface, and forces on the at least two containers tend to urge the at least two containers to fold upwardly around the connection of the at least two containers, wherein the adjacent ones of the at least two containers are connected to each other by pushing the adjacent ones of the at least two containers against one another using a vehicle such that the connecting device of the at least one connecting device of one container of the at least two containers makes a locking component of the connecting device of the at least one connecting device attached to an adjacent container of the at least two containers move such that the connecting device of the one container of the at least two containers is fitted into the locking component of the adjacent container of the at least two containers, and comprising the further step of closing the locking component of the connecting device attached to the adjacent container of the at least two containers after the connecting device of the one container of the at least two containers has been fitted into the locking component.

2. A combination of containers for use with a vehicle, comprising:

at least two containers, each container of the at least two containers including at least one grasping component at a front end of the container for permitting separate handling of each container by a loading device of a vehicle equipped with at least one engaging device for engaging with the grasping component and for lifting the container onto the vehicle and for removing it from the vehicle, and at least one first connecting device at at least one of the front end and the rear end of the container and at least one second connecting device at at least an opposite one of the front end and the rear end of the container than the at least one first connecting device for forming a connection for connecting the container to adjacent containers of the at least two containers such that a combination formed by connected containers of the at least two containers can be handled as one unit by the loading device, wherein the grasping component at the front end of any container is of sufficient strength to support the unit formed by the connected containers of the at least two containers while a rear lower edge of a rearmost container of the connected containers is supported on the ground and bottoms of the connected containers are otherwise separated off from any support surface, and wherein the connection has sufficient strength to support the at least two containers as a single, rigid unit when the rear lower edge of the rearmost container of the connected containers is supported on the ground and bottoms of the connected containers are otherwise separated off from any support surface such that forces on the containers tend to urge the containers to fold upwardly around the connection, and also when the at least two containers are inclined and are adapted to rest on a rear roller of a vehicle such that forces on the containers tend to urge the containers to fold downwardly around the connection, wherein a connecting hook is fixed in a top part of the one of the at least two containers and, in a corresponding place in a top part of the other container of the at least two containers, a connecting rod is provided, the connecting rod being adapted to be fitted to the connecting hook.

3. A combination as claimed in claim 2, wherein at least one of the first and second connecting device includes a locking component and at least one of the second and first connecting device, respectively, includes a counterpart that is complementary to the locking component, the locking component having a locking device movable between a closed and an open position, the locking device being movable into the closed position when the connected containers of the at least two containers are disposed against one another.

4. A combination as claimed in claim 3, wherein the locking device of the locking component is movable at least one of pivotably and axially.

5. A combination as claimed in claim 3, wherein the locking device is movable to a closed position under at least one of spring force and gravity.

6. A combination as claimed in claim 3, wherein at least one of the first connecting device and the second connecting device includes plural components and at least some components of the at least one of the first connecting device and the second connecting device are located in a recess in the container.

7. A combination as claimed in claim 2, wherein at least one of the first connecting device and the second connecting device includes plural components and at least some components of the at least one of the first connecting device and the second connecting device are located in a recess in the container.

8. A combination of containers for use with a vehicle, comprising:

at least two containers, each container of the at least two containers including at least one grasping component at a front end of the container for permitting separate handling of each container by a loading device of a vehicle equipped with at least one engaging device for engaging with the grasping component and for lifting the container onto the vehicle and for removing it from the vehicle, and at least one first connecting device at at least one of the front end and the rear end of the container and at least one second connecting device at at least an opposite one of the front end and the rear end of the container than the at least one first connecting device for forming a connection for connecting the container to adjacent containers of the at least two containers such that a combination formed by connected containers of the at least two containers can be handled as one unit by the loading device, wherein the grasping component at the front end of any container is of sufficient strength to support the unit formed by the connected containers of the at least two containers while a rear lower edge of a rearmost container of the connected containers is supported on the ground and bottoms of the connected containers are otherwise separated off from any support surface, and wherein the connection has sufficient strength to support the at least two containers as a single, rigid unit when the rear lower edge of the rearmost container of the connected containers is supported on the ground and bottoms of the connected containers are otherwise separated off from any support surface such that forces on the containers tend to urge the containers to fold upwardly around the connection, and also when the at least two containers are inclined and are adapted to rest on a rear roller of a vehicle such that forces on the containers tend to urge the containers to fold downwardly around the connection, wherein at least one of the first and second connecting device includes a locking component and at least one of the second and first connecting device, respectively, includes a counterpart that is complementary to the locking component, the locking component having a locking device movable between a closed and an open position, the locking device being movable into the closed position when the connected containers of the at least two containers are disposed against one another, and wherein the counterpart of one of the at least two containers is arranged on the one of the at least two containers such that it moves the locking device on an adjacent one of the at least two containers as the counterpart is pushed against the locking device when the one container and the adjacent one of the at least two containers are pushed against one another to form connected containers.

9. A combination as claimed in claim 8, wherein the locking device of the locking component is movable at least one of pivotably and axially.

10. A combination as claimed in claim 8, wherein the locking device is movable to a closed position under at least one of spring force and gravity.

* * * * *